United States Patent
Ihrke et al.

(10) Patent No.: US 8,562,049 B2
(45) Date of Patent: Oct. 22, 2013

(54) ROBOTIC FINGER ASSEMBLY

(75) Inventors: Chris A. Ihrke, Hartland, MI (US);
Lyndon Bridgwater, Houston, TX (US);
Myron A. Diftler, Houston, TX (US);
Douglas Martin Linn, White Lake, MI (US); Robert Platt, Houston, TX (US);
Brian Hargrave, Dickenson, TX (US);
Scott R. Askew, Houston, TX (US);
Michael C. Valvo, League City, TX (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 729 days.

(21) Appl. No.: 12/564,078

(22) Filed: Sep. 22, 2009

(65) Prior Publication Data
US 2011/0068595 A1    Mar. 24, 2011

(51) Int. Cl.
*B25J 15/10*    (2006.01)
*B25J 17/00*    (2006.01)

(52) U.S. Cl.
USPC ............................................ 294/106; 901/28

(58) Field of Classification Search
USPC ......... 294/106, 111; 414/5, 7; 623/24, 57, 64; 901/21, 27, 28; 74/490.04, 490.05, 74/490.06
See application file for complete search history.

(56) References Cited

U.S. PATENT DOCUMENTS

| | | | | |
|---|---|---|---|---|
| 4,986,280 A | * | 1/1991 | Marcus et al. | 33/512 |
| 4,986,723 A | | 1/1991 | Maeda | |
| 5,159,268 A | | 10/1992 | Wu | |
| 5,354,162 A | * | 10/1994 | Burdea et al. | 414/5 |
| 6,244,644 B1 | | 6/2001 | Lovchik et al. | |
| 7,138,976 B1 | * | 11/2006 | Bouzit et al. | 414/5 |
| 2001/0028174 A1 | | 10/2001 | Matsuda et al. | |
| 2007/0040400 A1 | | 2/2007 | Greenhill et al. | |
| 2009/0302626 A1 | * | 12/2009 | Dollar et al. | 294/106 |

FOREIGN PATENT DOCUMENTS

| | | |
|---|---|---|
| DE | 10139154 A1 | 2/2002 |
| EP | 1820610 A1 | 8/2007 |
| JP | 59028491 U | 2/1984 |
| JP | 63103990 U | 7/1988 |
| JP | 4210393 A | 7/1992 |
| JP | 9029674 A | 2/1997 |
| JP | 2003220589 A | 8/2003 |
| JP | 2003266357 A | 9/2003 |
| JP | 2004264222 A | 9/2004 |
| JP | 2008149444 A | 7/2008 |
| WO | 2008058061 A2 | 5/2008 |

OTHER PUBLICATIONS http://robotics.nasa.gov/courses/fall2002/event/oct1/NASA_Robotics_20021001.htm.

* cited by examiner

*Primary Examiner* — Paul T Chin
(74) *Attorney, Agent, or Firm* — Quinn Law Group, PLLC (57) ABSTRACT

A robotic hand includes a finger with first, second, and third phalanges. A first joint rotatably connects the first phalange to a base structure. A second joint rotatably connects the first phalange to the second phalange. A third joint rotatably connects the third phalange to the second phalange. The second joint and the third joint are kinematically linked such that the position of the third phalange with respect to the second phalange is determined by the position of the second phalange with respect to the first phalange.

7 Claims, 10 Drawing Sheets

ROBOTIC FINGER ASSEMBLY

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to robotic hands, and more particularly to robotic fingers.

BACKGROUND OF THE INVENTION

Typical robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types.

SUMMARY OF THE INVENTION

According to a first aspect of the disclosure, a robotic hand assembly includes a base structure; a finger having first, second, and third phalanges; a first joint operatively connecting the first phalange to the base structure such that the first phalange is selectively rotatable with respect to the base structure about a first axis; a second joint operatively connecting the second phalange to the first phalange such that the second phalange is selectively rotatable with respect to the first phalange about a second axis; and a third joint operatively connecting the third phalange to the second phalange such that the third phalange is selectively rotatable with respect to the second phalange about a third axis.

The third joint is kinematically linked to the second joint such that the position of the third phalange with respect to the second phalange is determined by the position of the second phalange with respect to the first phalange. The kinematic linkage between the second and third joints replaces one of the degrees of freedom of a human finger while closely approximating the movement of a human finger.

According to a second aspect of the disclosure, a robotic hand assembly includes a robotic finger having a first phalange and a second phalange, and a joint interconnecting the first phalange and the second phalange such that the first phalange is selectively rotatable with respect to the second phalange. A magnet is mounted with respect to the first phalange and has a first portion forming a first circle segment characterized by a first center point, and has a second portion forming a second circle segment characterized by a second center point. A Hall effect sensor is mounted with respect to the second phalange for rotation therewith respect to the first phalange. The shape of the magnet provides linearized output of the Hall effect sensor, thereby providing accurate positional data to a control system for the robotic hand.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
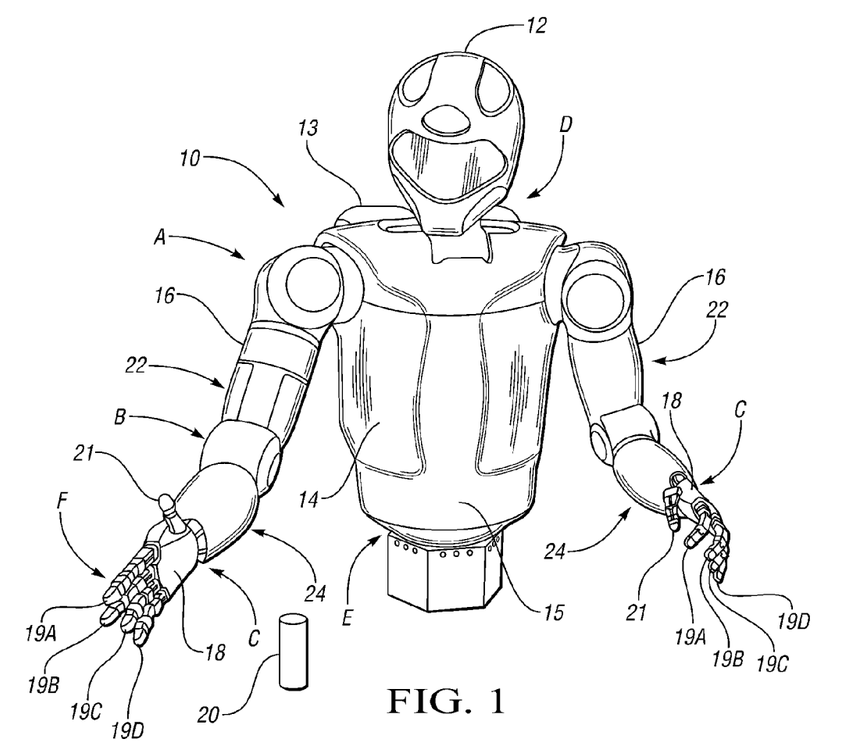
FIG. 1 is a schematic perspective illustration of a dexterous humanoid robot having two hands.

With reference to the drawings, wherein like reference numbers refer to the same or similar components throughout the several views, FIG. 1 shows a dexterous humanoid robot 10 adapted to perform one or more tasks with multiple degrees of freedom (DOF).

The humanoid robot 10 may include a head 12, torso 14, waist 15, arms 16, hands 18, fingers 19A-19D, and thumbs 21, with various joints being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply.

According to one embodiment, the robot 10 is configured with a plurality of independently and interdependently-moveable robotic joints, such as but not limited to a shoulder joint assembly (arrow A), an elbow joint assembly (arrow B), a wrist joint assembly (arrow C), a neck joint assembly (arrow D), and a waist joint assembly (arrow E), as well as the various finger and thumb joint assemblies (arrow F) positioned between the phalanges of each robotic finger 19A-19D and thumb 21.

The arm 16 is divided into an upper arm 22 and a lower arm (or forearm) 24. The upper arm 22 extends from the shoulder joint assembly (arrow A) to the elbow joint assembly (arrow B). Extending from the elbow joint (arrow B) is the lower arm 24, hands 18, fingers 19, and thumbs 21. For the purpose of simplification, as described herein, the upward direction is toward the head 12 and the downward direction is toward the waist 15. Those skilled in the art will appreciate that since the robot 10 is intended to simulate a humanoid, the robot will be substantially symmetrical about a vertical plane bisecting the torso and head, and essentially include an identical symmetrical structure on both the left and right sides.

Figure 2:
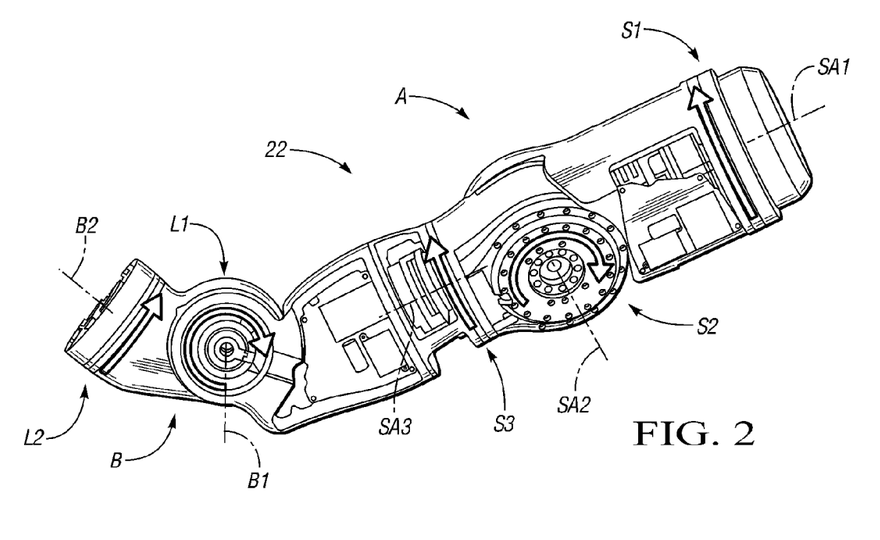
FIG. 2 is a schematic perspective illustration of an upper arm for the dexterous humanoid robot of FIG. 1.

Referring to FIG. 2, the upper arm 22 is illustrated. Although only one upper arm 22 for the arms 16 is shown, both the left and the right arms 16 operate in the same manner as described below. The upper arm 22 has a shoulder joint assembly (arrow A) that includes a first shoulder joint S1 providing a first DOF, and second shoulder joint S2 providing a second DOF, and a third shoulder joint S3 providing a third degree of freedom. Together the first through third shoulder joints S1, S2, S3 perform the movements that represent the movements a human shoulder can perform. Specifically, rotation of the first shoulder joint S1 about a first shoulder axis SA1 moves a second shoulder axis SA2 for the second shoulder joint S2 into a desired position. Based upon the position of the first shoulder joint S1, rotation of the second shoulder joint S2 about the second shoulder axis SA2 then moves the arm 16 up and down relative to the torso 14, or forward and backward relative to the torso 14. The third shoulder joint S3 rotates the upper arm 22 about a third shoulder axis SA3. Rotation of the third shoulder joint S3 rotates the upper arm 22 axially, i.e. rotation of the third shoulder joint S3 rotates the elbow joint assembly (arrow B) to face upwards or downwards. Therefore, together the first shoulder joint S1, the second shoulder joint S2, and the third shoulder joint S3 form the motions of a shoulder joint assembly (arrow A).

The upper arm 22 also includes an elbow joint assembly (arrow B) which includes a first elbow joint L1 and a second elbow joint L2. The first elbow joint L1 and second elbow joint L2 each provide a degree of freedom. Together the first elbow joint L1, and the second elbow joint L2 perform the movements that represent the movements a human elbow can perform. Rotation of the first elbow joint L1 about a first elbow axis B1 causes the upper arm 22, below the elbow joint assembly (arrow B) to bend and straighten. Additionally, rotation of the second elbow joint L2 about a second elbow axis B2 causes the upper arm 22, below the elbow joint assembly (arrow B) to rotate axially, i.e. rotation of the second elbow joint L2 about the second elbow axis B2 rotates the lower arm 24 and hand 18 (FIG. 1) to face palm up or down.

Figures 3, 4:
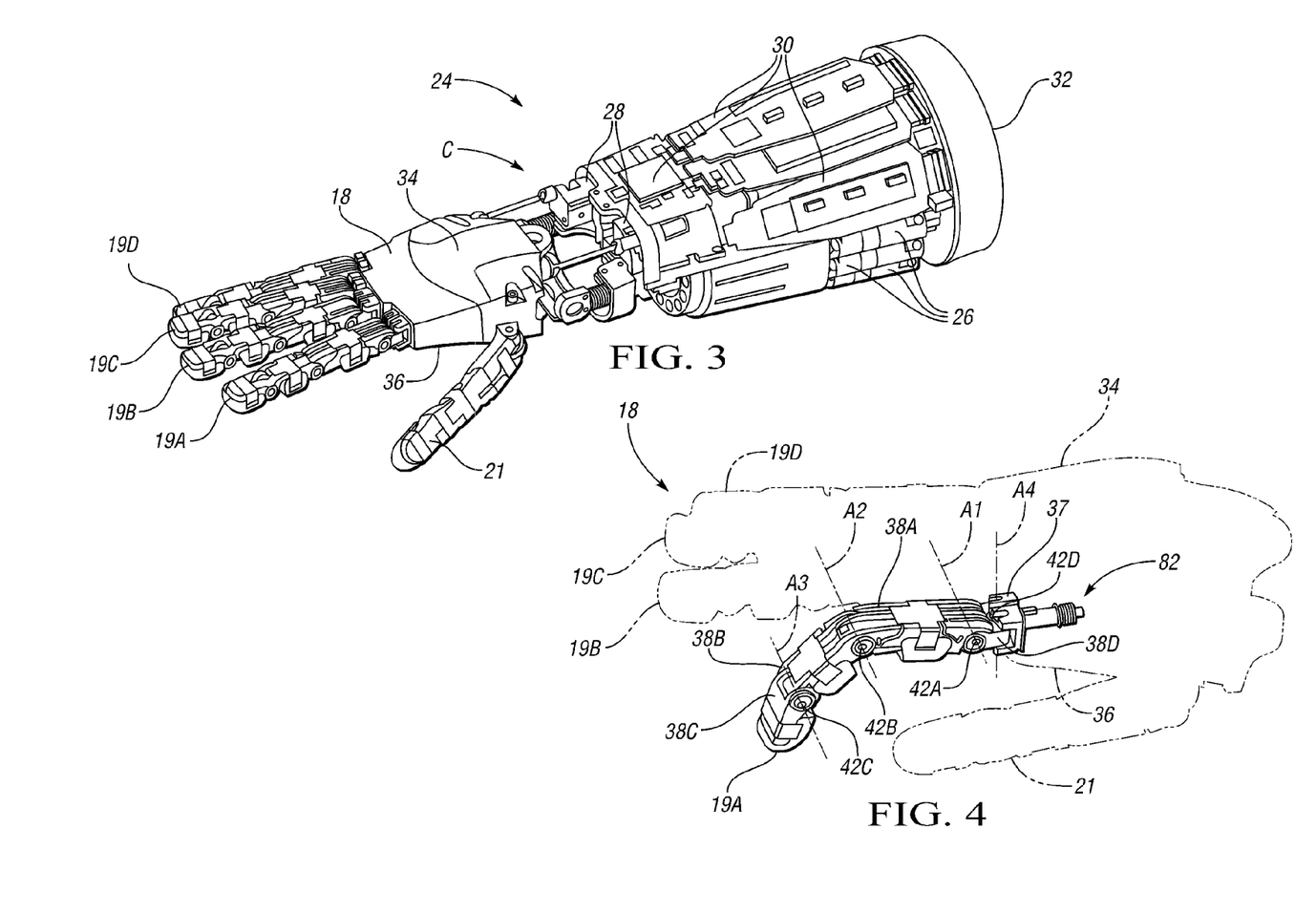
FIG. 3 is a schematic perspective illustration of a lower arm for the dexterous humanoid robot of FIGS. 1 and 2.
FIG. 4 is a schematic, perspective view of a finger of one of the hands of FIG. 1 in a first position.

FIG. 3 illustrates the lower arm 24, including the wrist joint assembly (arrow C), the hand 18, the fingers 19A-19D, and thumb 21. The lower arm 24 includes a plurality of finger (and thumb) actuators 26 and a plurality of wrist actuators 28. Additionally, a plurality of controls 30 for the finger actuators 26 and the wrist actuators 28 are also supported on the lower arm 24. The lower arm 24 is attached to a load cell 32 which is used to connect the lower arm 24 with the upper arm 22. The hand 18 includes a base structure 34 that defines the palm 36 of the hand 18. Fingers 19A-19D and thumb 21 are movably mounted to the base structure 34 and selectively curl toward the palm 36 in order to grip an object, such as the one shown at 20 in FIG. 1.

In the embodiment depicted, the hand 18 is comparable in size to that of a sixtieth to eight-fifth percentile human male hand. More specifically, in the embodiment depicted, the length of the hand 18 is 7.9 inches (eightieth percentile human); the breadth, or width, of the hand 18 is 3.6 inches (sixtieth percentile human); and the circumference of the hand (around the base structure) is 8.8 inches (eighty-fifth percentile human).

Referring to FIGS. 4-7, finger 19A corresponds in position and function to a human index finger. Finger 19A includes a base member 37 operatively connected to the base structure 34 of the hand 18. The finger 19A also includes a plurality of rigid links, or phalanges 38A-38D, and four joints 42A-42D. Joint 42A operatively connects proximal phalange 38A to the base structure 34 such that the phalange 38A is selectively rotatable with respect to the structure 34 about axis A1. Joint 42B rotatably mounts phalange 38B to phalange 38A such that phalange 38B is selectively rotatable with respect to phalange 38A about axis A2. Joint 42C rotatably mounts phalange 38C to phalange 38B such that phalange 38C is selectively rotatable with respect to phalange 38B about axis A3. Axes A1, A2, and A3 are parallel to one another.

In the embodiment depicted, the proximal phalange 38A is operatively connected to the base structure 34 by phalange 38D, joint 42D, and base member 37. More specifically, joint 42A rotatably mounts phalange 38A to phalange 38D; joint 42D rotatably mounts phalange 38D to the base member 37 such that phalange 38D, and, correspondingly, phalanges 38A-38C, are selectively rotatable with respect to the base member 37 and the base structure 34 about axis A4. Axis A4 is perpendicular to axes A1, A2, and A3. Thus, joint 42D permits rotation of the finger 19A to the right and left.

Figure 7:
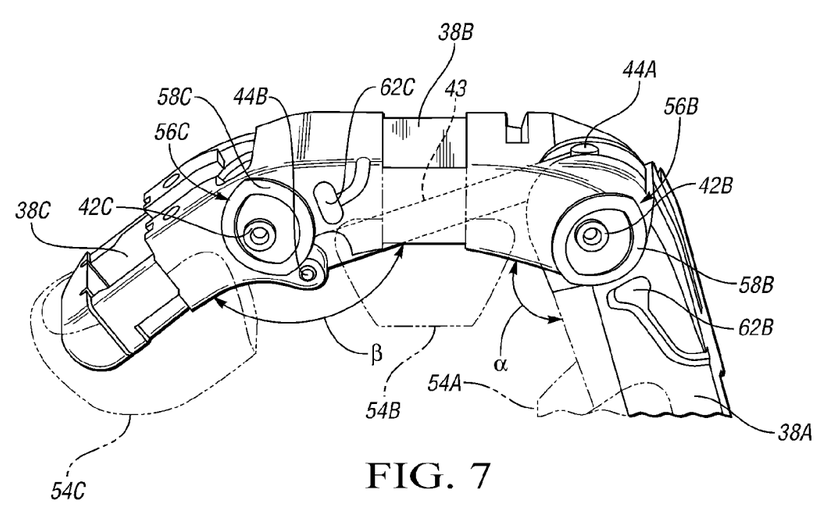
FIG. 7 is a schematic, side view of a portion of the finger of FIG. 4.
Figure 8:
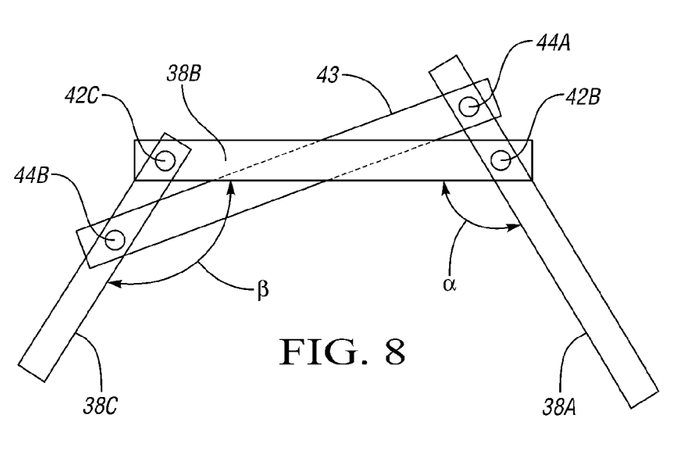
FIG. 8 is another schematic, side view of the portion of the finger of FIG. 7.

Referring to FIGS. 7-8, the finger 19A includes a linkage 43. One end of the linkage 43 is rotatably connected to phalange 38A by joint 44A such that the linkage 43 is selectively rotatably with respect to phalange 38A about an axis that is parallel to axes A1, A2, and A3. The other end of the linkage 43 is rotatably connected to phalange 38C by joint 44B such that the linkage 43 is selectively rotatable with respect to phalange 38C about an axis that is parallel to axes A1, A2, and A3. Accordingly, phalanges 38A-38C and linkage 43 cooperate to define a four-bar linkage.

Figure 9:
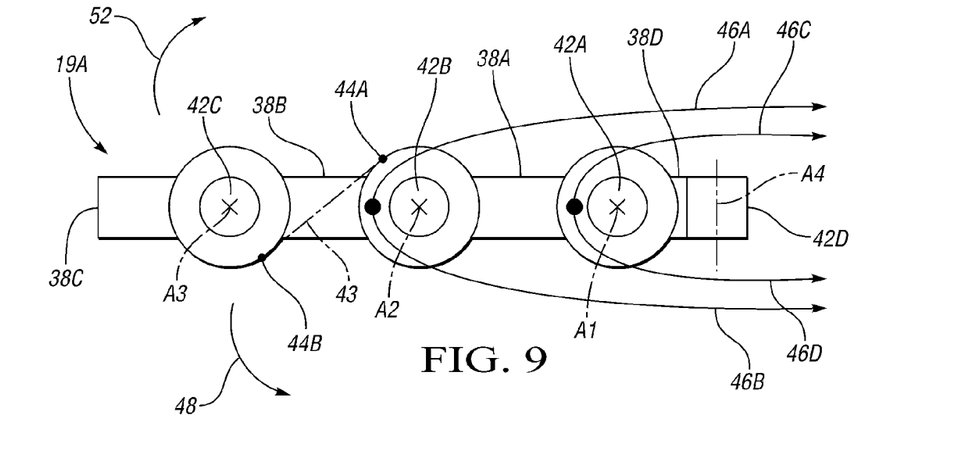
FIG. 9 is a schematic, side view of the finger of FIG. 4 depicting tendon routing.

Referring to FIG. 9, wherein like reference numbers refer to like components from FIGS. 1-8, movement of the phalanges 38A-38D about joints 42A-42D is accomplished by robotic tendons 46A-46D, i.e., flexible members such as cables. Each of the tendons 46A-46D is operatively connected to a respective actuator (shown at 26 in FIG. 3) in the forearm (shown at 24 in FIG. 3). In an exemplary embodiment, the actuators 26 are electric motors operatively connected to the tendons 46A-46D by drive mechanisms configured to convert the rotary motion of the motors to linear motion to drive the tendons 46A-46D. The placement of the actuators and drive mechanisms in the forearm 24 and/or wrist contributes to the compactness of the hand 18.

The routing of the tendons 46A-46D with respect to the joints 42A-D and the axes A1-A4 enables the finger 19A to be fully controlled through three degrees of freedom using only the four tendons 46A-46D. Two opposing tendons 46A, 46B control the medial pitch joint 42B, and two opposing tendons 46C, 46D control the proximal pitch joint 42A. One end of tendon 46B is operatively connected to phalange 38B on one side of joint 42B and axis A2 such that tension in tendon 46B causes rotation of phalange 38B with respect to phalange 38A about axis A2 in a first direction 48. One end of tendon 46A is operatively connected to phalange 38B on the opposite side of joint 42B and axis A2 from tendon 46B such that tension in tendon 46A causes rotation of phalange 38B with respect to phalange 38A about axis A2 in a second direction 52 opposite the first direction 48.

Figure 5:
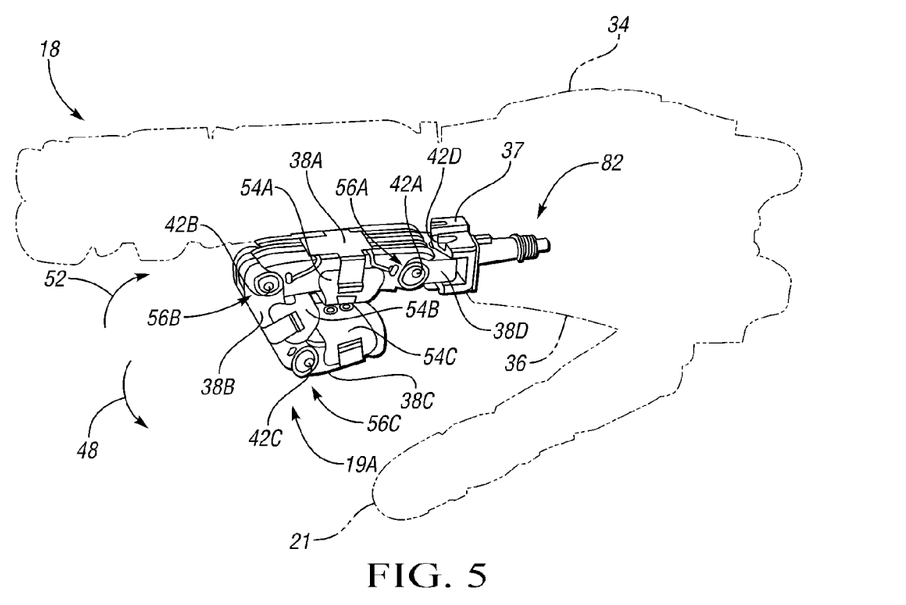
FIG. 5 is a schematic, perspective view of the finger of FIG. 4 in a second position.
Figure 6:
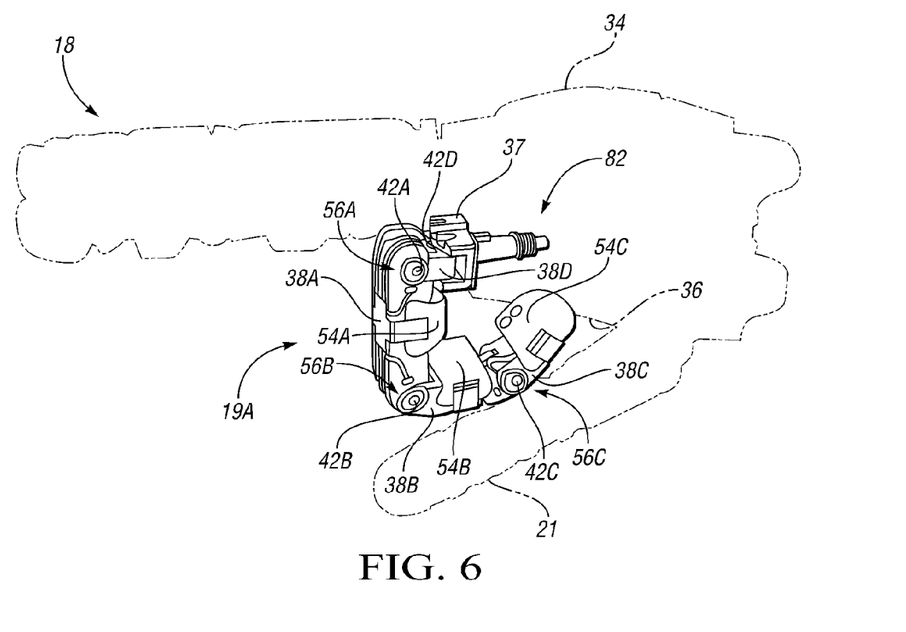
FIG. 6 is a schematic, perspective view of the finger of FIGS. 4 and 5 in a third position.

One end of tendon 46D is operatively connected to phalange 38A on one side of joint 42A and axis A1 such that tension in tendon 46D causes rotation of phalange 38A with respect to phalange 38D about axis A1 in the first direction 48. One end of tendon 46C is operatively connected to phalange 38A on the opposite side of joint 42A and axis A1 from tendon 46D such that tension in tendon 46C causes rotation of phalange 38A with respect to phalange 38D about axis A1 in the second direction 52. Rotation of the phalanges in the first direction 48 causes the phalanges to rotate toward the palm 36, as shown in FIGS. 5-6, and thus rotation of the phalanges in the first direction 48 enables the hand 18 to grip an object. Rotation of the phalanges in the second direction 52 causes the phalanges to rotate away from the palm 36, and thus causes the finger 19A to release a grip on the object.

Referring again to FIGS. 7-8, joint 42C is kinematically linked to joint 42B via linkage 43, and thus the angular position of joint 42C is dependent upon the angular position of joint 42B. Accordingly, the rotational position of phalange 38C with respect to phalange 38B is dependent upon the rotational position of phalange 38B with respect to phalange 38A. More specifically, the angle β formed between phalanges 38C and 38B is determined by the angle α formed between phalanges 38B and 38A: decreasing α causes a corresponding decrease in β. An exemplary relationship between the rotational position of joint 42C and joint 42B is depicted in FIG. 10.

Figure 10:
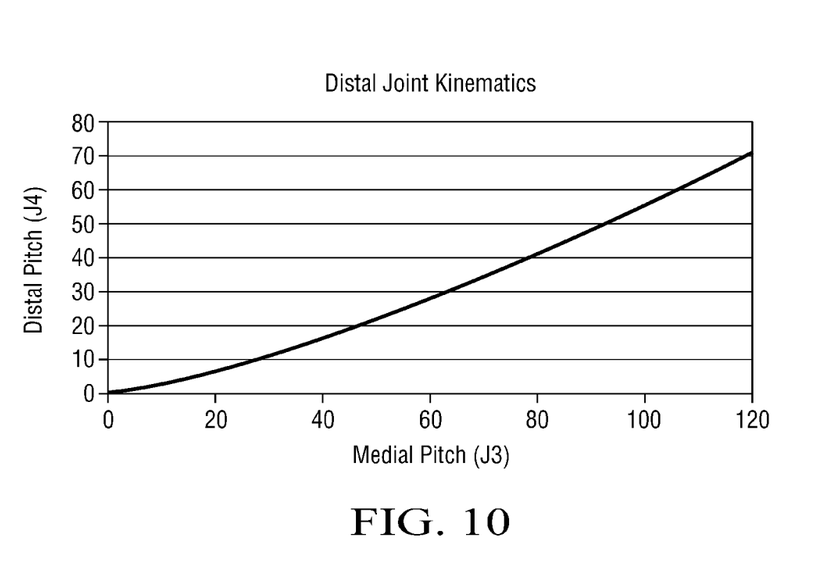
FIG. 10 is a graph depicting the position of one of the joints in the finger as a function of the position of another one of the joints in the finger.

Referring to FIG. 10, the angle of joint 42C is shown as a function of the angle of joint 42B. It may be desirable for the function to be as linear as the design constraints of the finger 19A will allow. The four bar linkage comprising phalanges 38A-38C and linkage 43 is designed such that the linkage 43 is a straight line member between its end shafts, and is in tension during grasping. Linkage 43 in one embodiment is a rigid member; in another embodiment, linkage 43 is a compliant member, such as a spring, to achieve compliance of the distal pitch joint 42C during grasping.

Accordingly, tendons 46A and 46B control the position of joint 42C via their control of joint 42B. A human finger is generally considered to have four independently controllable degrees of freedom. By kinematically linking joints 42B and 42C, finger 19A effectively approximates the poses achievable by a human finger with only three independently controllable degrees of freedom, thereby eliminating the tendons that would be required to control joint 42D independently.

Figure 11:
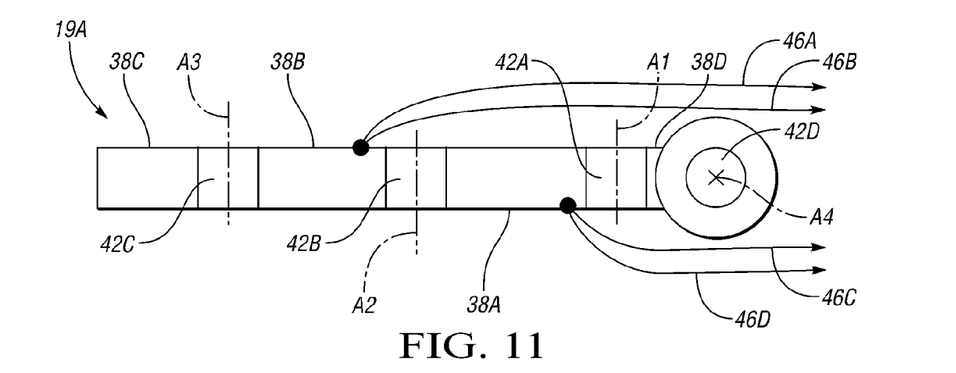
FIG. 11 is a schematic, top view of the thumb of FIG. 4 depicting tendon routing.

Referring to FIG. 11, wherein like reference numbers refer to like components from FIGS. 1-11, there are no tendons dedicated to controlling the position of the yaw joint 42D. Instead, tendons 46A and 46B are routed on one side of joint 42D and axis A4, and tendons 46C and 46D are routed on another side of joint 42D and axis A4. The balance of tension in these four tendons 46A-46D is manipulated to control the position of joint 42D and, correspondingly, the angular position of phalanges 38A-38D with respect to the base structure 34.

Figure 12:
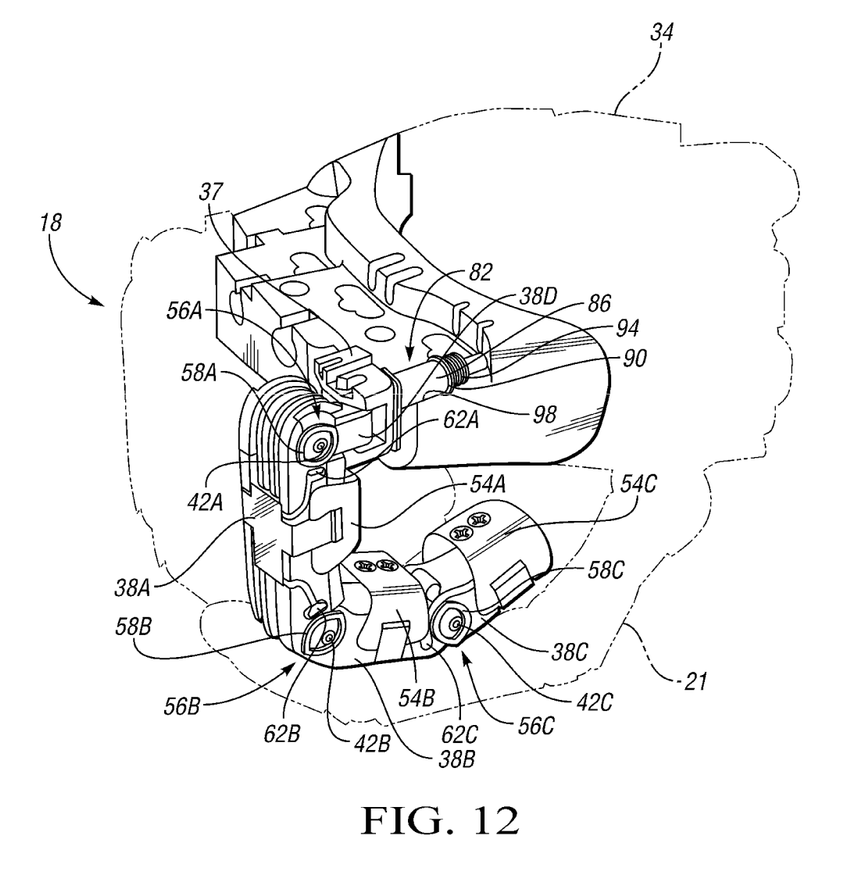
FIG. 12 is a schematic, perspective view of the finger of FIG. 4 mounted to base structure by a shock mount.

Referring to FIG. 12, the finger 19A includes at least two types of sensors. More specifically, the sensors of the finger 19A include tactile load cells 54A-54C, each of which is mounted to a respective phalange 38A-38C. The finger 19A also includes a plurality of joint position sensor assemblies 56A-56C, each of which is configured to measure the absolute angular position of a respective one of the joints 42A-42C and the relative angular position of a phalange relative to a connecting phalange. Each of the joint position sensor assemblies 56A-56C includes a respective magnet 58A-58C and a respective Hall effect sensor 62A-62C.

Figure 13:
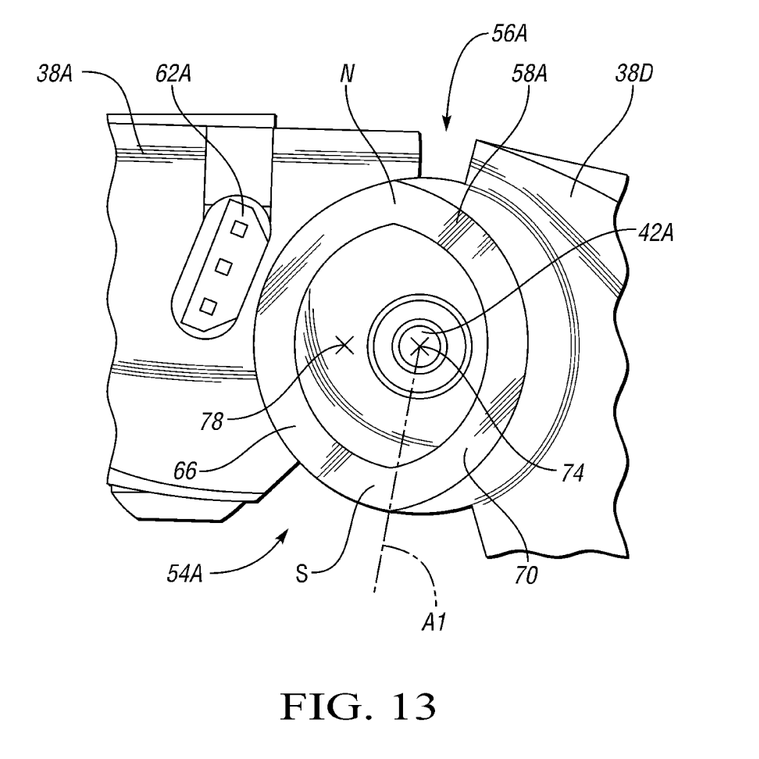
FIG. 13 is a schematic, side view of a sensor assembly at a joint of the finger of FIG. 4.

Referring to FIG. 13, sensor assembly 56A is representative of sensor assemblies 56B and 56C, and thus magnet 58A and sensor 62A are representative of magnets 58B, 58C and sensors 62B, 62C, respectively. Magnet 58A is rigidly mounted with respect to phalange 38D, and sensor 62A is rigidly mounted with respect to phalange 38A. Magnet 58A is characterized by two portions 66, 70. Portion 66 is a segment of a circle having a center point 74 on axis A1. Portion 70 is a segment of a circle having a center point at 78. The north pole N of the magnet 58A is disposed at one intersection of the portions 66, 70, and the south pole S of the magnet 58A is disposed at the other intersection of the portions 66, 70. In the embodiment depicted, portion 66 has the same radius as portion 70, and the concave sides of portions 66, 70 face one another. The magnet 58A circumscribes both center points 74, 78.

Sensor 62A is positioned on phalange 38A such that, as phalange 38A rotates with respect to phalange 38D about axis A1, the sensor 62A maintains a constant distance from portion 66 of the magnet 58A. The shape of the magnet 58A and the placement of the sensor 62A provide a linear relationship between angular position of the phalange 38A with respect to phalange 38D and the change in magnetic field that is read by sensor 62A. In the embodiment depicted, sensor assembly 56A generates an approximately linear signal over a 150-degree usable range of angular positions.

Magnet 58A is mounted with respect to phalange 38D and sensor 62A is mounted with respect to phalange 38A, and thus sensor assembly 56A measures the rotational position of phalange 38A with respect to phalange 38D. Magnet 58B is mounted with respect to phalange 38B and sensor 62B is mounted with respect to phalange 38A, and thus sensor assembly 56B measures the rotational position of phalange 38B with respect to phalange 38A. Magnet 58C is mounted with respect to phalange 38C and sensor 62C is mounted with respect to phalange 38B, and thus sensor assembly 56C measures the rotational position of phalange 38C with respect to phalange 38B. A sensor assembly (not shown) substantially identical to sensor assemblies 56A-56C measures the position of phalange 38D with respect to base member 37 as phalange 38D rotates about axis A4.

In the embodiment depicted, the range of motion of joint 42A (proximal pitch) is −10° to 95°; the range of motion of joint 42B (medial pitch) is 0° to 120°; the range of motion of joint 42C (distal pitch) is 0° to 70°; and the range of motion of joint 42D (yaw) is −20° to 20°.

Figure 14:
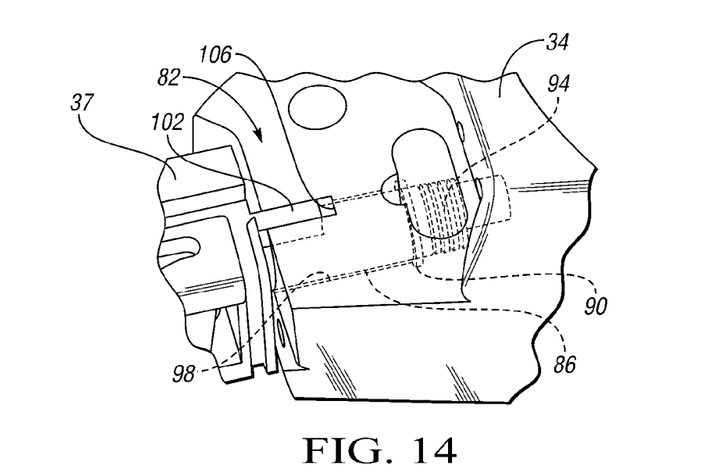
FIG. 14 is a schematic, perspective view of the shock mount of FIG. 12.

Referring to FIGS. 12 and 14, finger 19A is mounted to the base structure 34 by a shock mount 82. The shock mount 82 includes a keyed shaft 86, a retainer ring 90, and a spring 94. The cylindrical shaft 86 is slidingly engaged within a cylindrical cavity 98 defined by the base structure 34. The rectangular key 102 extends within a rectangular portion 106 of cavity 98 to prevent rotation of the shaft 86 with respect to the structure 34. The retainer ring 90 is larger than the cavity 98 and thus retains the shaft 86 inside the cavity 98. The spring 94 biases the shaft 86 outward and absorbs shocks that may be exerted on the finger 19A.

Figure 15:
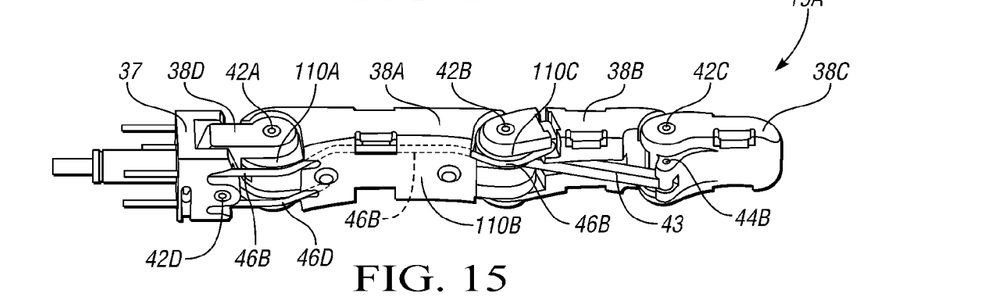
FIG. 15 is another schematic, perspective view of the finger of FIG. 4.

It should be noted that, although the tendons 46A-46D are depicted in FIGS. 9 and 11 as being external to the phalanges 38A-38D, each of the tendons is routed through a respective internal guide channel. In the embodiment depicted, tendons 46A-46D are braided polymers. Referring to FIG. 15, the finger 19A includes inserts, such as the ones shown at 110A, 110B, 110C, where sliding friction of the tendons 46A-46D occurs. The inserts 110A, 110B, 110C are softer and weaker than the structural material of the phalanges 38A-38D, and are selectively replaceable. In one embodiment, the tendons 46A-46D comprise Vectran® and the inserts 110A, 110B, 110C are bronze.

Figure 16:
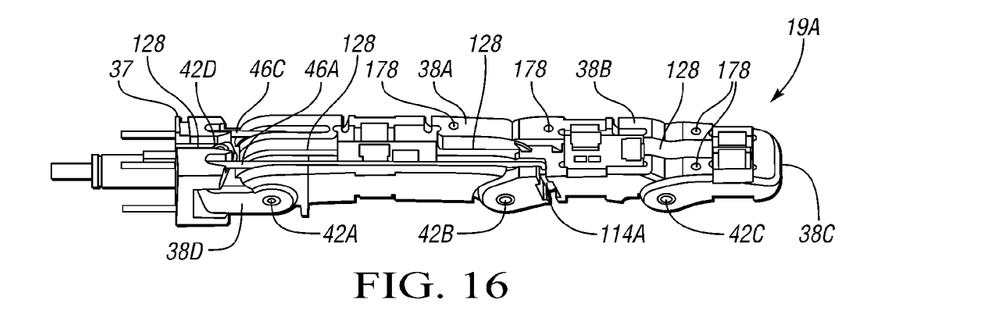
FIG. 16 is yet another schematic, perspective view of the finger of FIG. 4.
Figure 17:
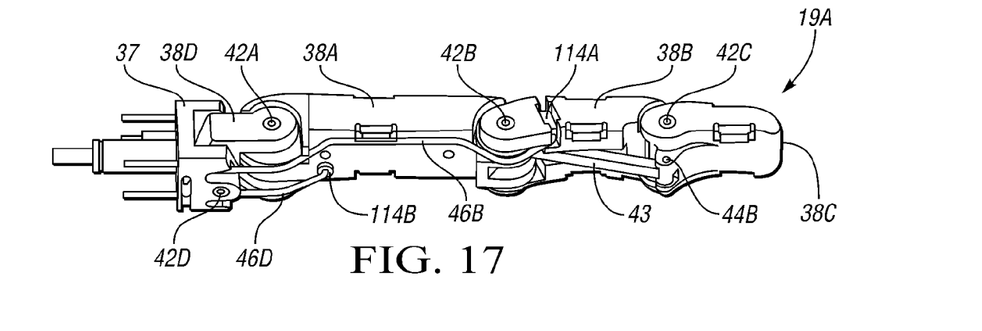
FIG. 17 is yet another schematic, perspective view of the finger of FIG. 4.

Referring to FIGS. 16 and 17, the finger 19A is configured to accommodate, for each pair of opposing tendons, a respective bidirectional tendon terminator 114A, 114B. More specifically, tendon 46A extends on the non-palmar, or dorsal, side of axes A1 and A2, and is mounted to phalange 38B via tendon terminator 114A. Tendon 46B extends on the palmar side of axes A1 and A2, and is mounted to phalange 38B via tendon terminator 114A. Similarly, tendon 46C extends on the non-palmar side of axis A1 and is mounted to phalange 38A by tendon terminator 114B. Tendon 46D extends on the palmar side of axis A1 and is mounted to phalange 38A by tendon terminator 114B.

Figure 18:
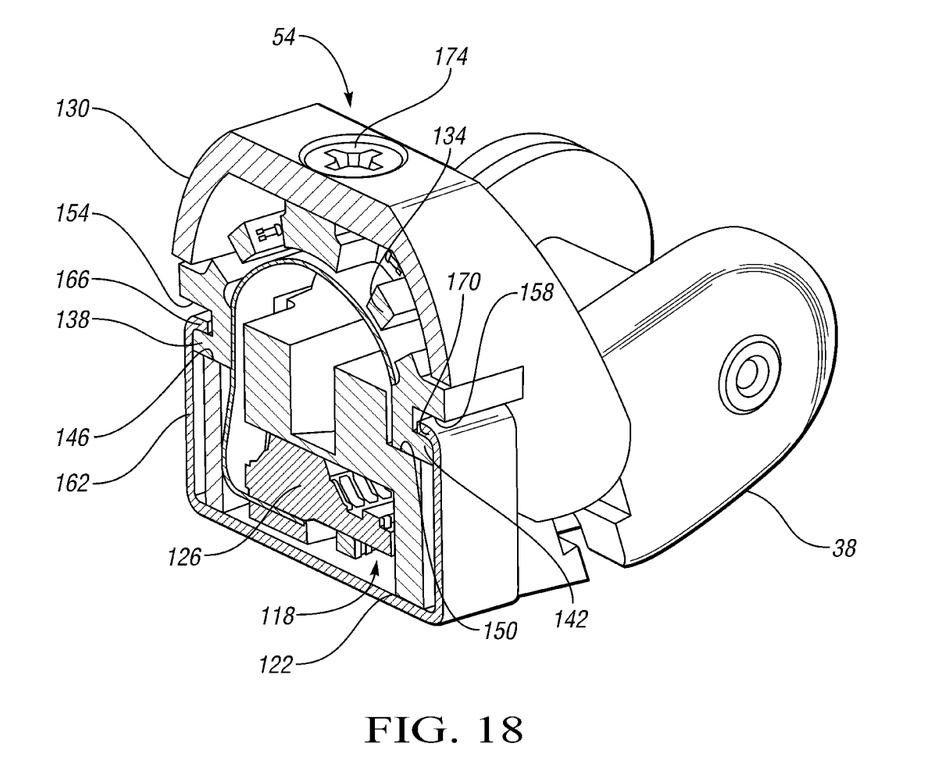
FIG. 18 is a schematic, perspective, cutaway view of a phalange and sensor assembly that is representative of the phalanges of the finger of FIG. 4.

Referring to FIG. 18, a phalange 38 is shown in a cutaway, perspective view. Phalange 38 is representative of phalanges 38A-38C, and sensor 54 is representative of sensors 54A-54C. Phalange 38 defines a chamber 118 that is characterized by an opening 122. Compact electronics 126 are contained within the chamber 118. The functions of the electronics 126 include providing power to the sensors, collecting analog sensor data, converting analog signals to digital signals, multiplexing digital signals, and communicating data to upstream electronics. Referring again to FIG. 16, the finger 19A includes a central channel 128 that extends the length of the finger 19A to accommodate the wiring required to connect the sensors, the compact electronics, and the upstream electronics.

Figure 19:
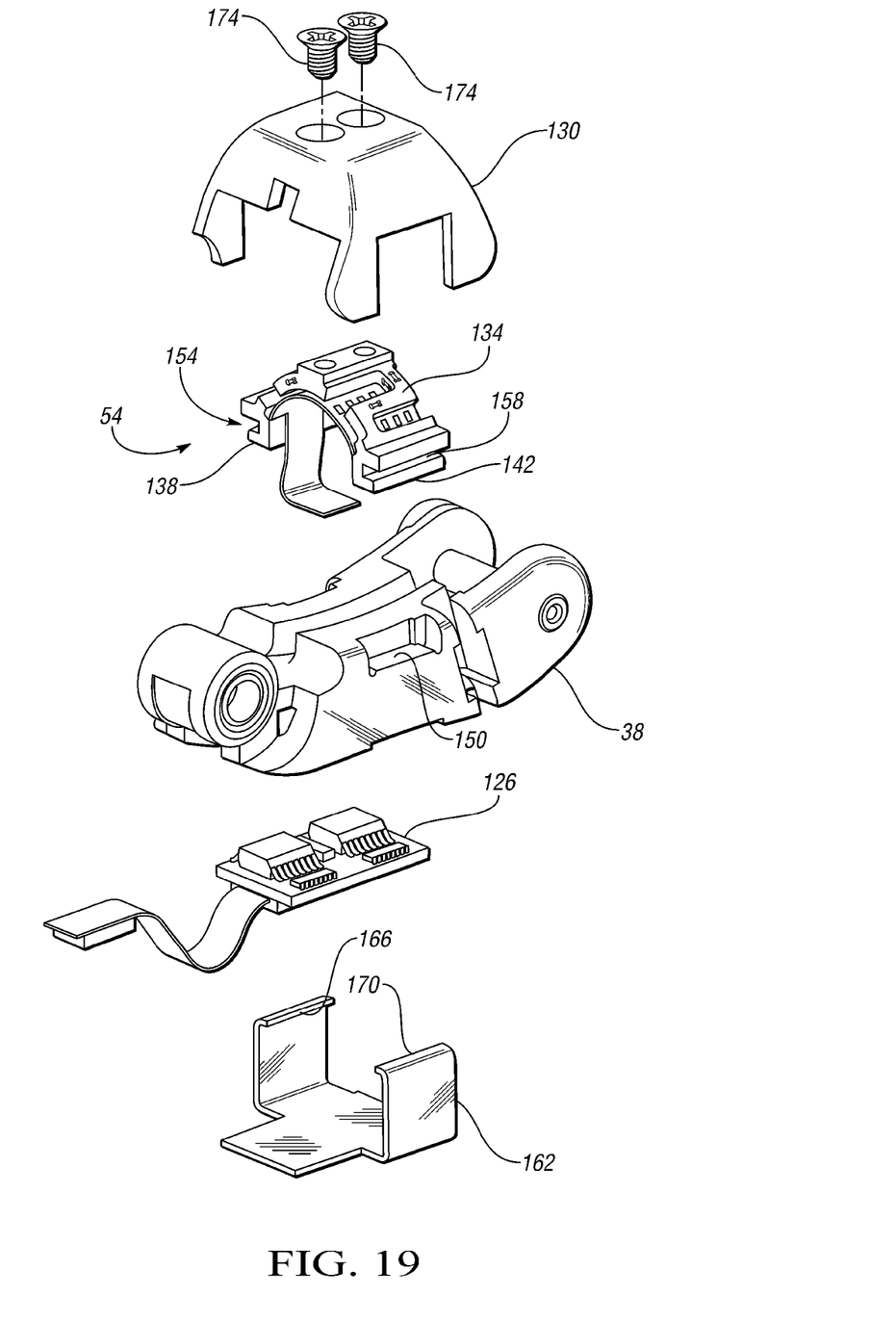
FIG. 19 is a schematic, exploded view of the phalange and sensor assembly of FIG. 18.

Referring to FIGS. 18 and 19, sensor 54 includes a sensor cover 130 and a sensor assembly 134. The sensor assembly 134 generates sensor signals in response to loads applied to the sensor cover 130, and transmits the sensor signals to the electronics 126. The sensor assembly 134 is generally C-shaped, and is characterized by a flange 138, 142 at each end. Each flange 138, 142 abuts a respective shoulder 146, 150 formed by the phalange 38. The flanges 138, 142 of the sensor assembly 134 also partially define respective slots 154, 158.

A C-shaped clip 162 includes a flange 166, 170 at each end. The clip 162 extends across opening 122 to enclose the chamber 118 and the electronics 126 contained therein. Each flange 166, 170 engages a respective one of the slots 154, 158 to secure the clip 162 to the sensor assembly 134, and to retain the sensor assembly 134 to the phalange 38. The cover 130 is mounted to the sensor assembly 134 by screws 174.

Referring again to FIG. 16, the finger 19A is designed to accommodate a glove or skin-like covering (not shown) for protection from the environment and to provide grip surfaces to the tactile sensors that are appropriate for a specific task. The finger 19A includes a plurality of threaded attachment holes 178 designed to secure the glove or skin-like covering to the finger, preventing slippage at the critical locations.

While the best modes for carrying out the invention have been described in detail, those familiar with the art to which this invention relates will recognize various alternative designs and embodiments for practicing the invention within the scope of the appended claims

The invention claimed is:

1. A robotic hand assembly comprising:
    a robotic finger including a first phalange and a second phalange;
    a joint interconnecting the first phalange and the second phalange such that the first phalange is selectively rotatable with respect to the second phalange;
    a magnet being mounted with respect to the first phalange and having a first portion forming a first circle segment characterized by a first center point, and having a second portion forming a second circle segment characterized by a second center point different from the first center point; and
    a Hall effect sensor mounted with respect to the second phalange for rotation therewith with respect to the first phalange.

2. The robotic hand assembly of claim 1, wherein the Hall effect sensor and the magnet are disposed such that the Hall effect sensor maintains a constant distance from the first portion over a range of rotation of the second phalange.

3. The robotic hand assembly of claim 1, wherein the magnet circumscribes the first and second center points.

4. The robotic hand assembly of claim 1, wherein the first circle segment intersects the second circle segment at first and second intersection points;
    wherein the north pole of the magnet is at the first intersection point; and
    wherein the south pole of the magnet is at the second intersection point.

5. The robotic hand assembly of claim 1, wherein the radius of the first portion is equal to the radius of the second portion.

6. The robotic hand assembly of claim 1, wherein the joint interconnects the first phalange and the second phalange such that the first phalange is selectively rotatable with respect to the second phalange about an axis; and
    wherein the first center point is on the axis.

7. The robotic hand assembly of claim 1, wherein each of the first and second portions has a respective concave side; and
    wherein the respective concave sides face one another.

* * * * *